United States Patent
Bauer et al.

(10) Patent No.: US 8,974,333 B2
(45) Date of Patent: Mar. 10, 2015

(54) TENSIONING DEVICE WITH AT LEAST TWO VENT ELEMENTS

(75) Inventors: Christian Bauer, Munich (DE); Tobias Schmid, Bronnen (DE)

(73) Assignee: IWIS Motorsysteme GmbH & Co., KG, Munich (DE)

( * ) Notice: Subject to any disclaimer, the term of this patent is extended or adjusted under 35 U.S.C. 154(b) by 47 days.

(21) Appl. No.: 13/703,615

(22) PCT Filed: Dec. 30, 2011

(86) PCT No.: PCT/EP2011/006613
§ 371 (c)(1),
(2), (4) Date: Jan. 16, 2013

(87) PCT Pub. No.: WO2012/119632
PCT Pub. Date: Sep. 13, 2012

(65) Prior Publication Data
US 2013/0337954 A1 Dec. 19, 2013

(30) Foreign Application Priority Data
Mar. 9, 2011 (DE) .......................... 10 2011 013 374

(51) Int. Cl.
*F16H 7/08* (2006.01)

(52) U.S. Cl.
CPC ................ *F16H 7/08* (2013.01); *F16H 7/0836* (2013.01); *F16H 2007/0806* (2013.01); *F16H 2007/0817* (2013.01); *F16H 2007/0859* (2013.01)
USPC ........................................................ 474/110

(58) Field of Classification Search
CPC ................ F16H 2007/0806; F16H 2007/0817; F16H 2007/0859; F16H 7/08; F16H 7/0836
USPC .......................................... 474/101, 109, 110
See application file for complete search history.

(56) References Cited

U.S. PATENT DOCUMENTS

| | | | | |
|---|---|---|---|---|
| 4,772,251 A | * | 9/1988 | Goppelt et al. | ............... 474/101 |
| 5,346,436 A | | 9/1994 | Hunter et al. | |
| 5,643,117 A | | 7/1997 | Dembosky | |
| 2005/0059517 A1 | * | 3/2005 | Poiret | ........................... 474/110 |

FOREIGN PATENT DOCUMENTS

| | | |
|---|---|---|
| DE | 4015708 C1 | 7/1991 |
| DE | 4431161 A1 | 3/1995 |
| DE | 199651089 A1 | 6/1997 |
| DE | 202007008335 U1 | 11/2008 |
| EP | 1067275 A2 | 1/2001 |
| EP | 1067314 A2 | 1/2001 |
| EP | 1101975 A2 | 5/2001 |

* cited by examiner

*Primary Examiner* — William E Dondero
*Assistant Examiner* — Robert T Reese
(74) *Attorney, Agent, or Firm* — Baker and Hostetler LLP

(57) ABSTRACT

A tensioning device for a continuous drive element includes a housing, a tensioning piston movably guided in the housing, and a pressure chamber for hydraulic fluid formed between the housing and the tensioning piston, wherein the tensioning piston comprises a vent opening, and a vent channel between the pressure chamber and the vent opening, formed by assembling at least two vent elements, wherein in the one vent element, in the contact surface to the second vent element, separate partial areas of the vent channel are formed by molded groove sections which are connected to each other by transfer grooves molded in the second vent element in the contact surface to the first vent element, such that sections of a main portion of the cross-section of flow of the vent channel are arranged on one side, and sections are arranged on another side of a plane spanned by the contact surfaces.

14 Claims, 6 Drawing Sheets

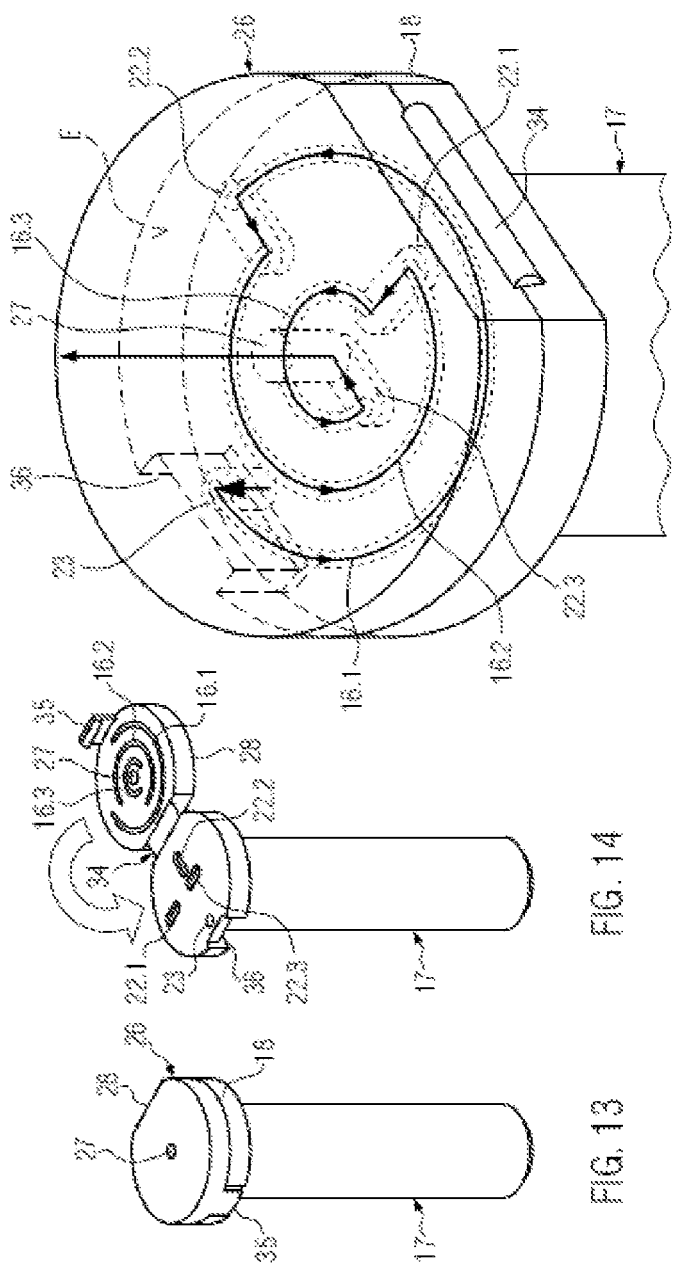

TENSIONING DEVICE WITH AT LEAST TWO VENT ELEMENTS

CROSS-REFERENCE TO RELATED APPLICATIONS

This application is a National Stage of International patent application PCT/EP11/06613, filed on Dec. 30, 2011, which claims priority to foreign German patent application No. DE 102011013374.7, filed on Mar. 9, 2011, the disclosures of which are incorporated by reference in their entirety.

FIELD OF THE INVENTION

The present invention relates to a tensioning device for a continuous drive element, in particular a timing chain of an internal combustion engine, having a housing, a tensioning piston movably guided in the housing, and a pressure chamber for a hydraulic fluid formed between the housing and the tensioning piston, the piston comprising a vent opening, and a vent channel disposed between the pressure chamber and the vent opening being provided and formed by assembling at least two vent elements.

BACKGROUND

Such a tensioning device is e. g. known from DE 4431161 A1. It is primarily employed for tensioning timing chains of a timing chain drive in an internal combustion engine. The tensioning piston presses onto a swiveling tensioning rail which is pressed against the timing chain. The tensioning device is connected to the engine oil hydraulics and is supplied, via an inflow with a check valve, with hydraulic oil which then flows into the pressure chamber. In this known device, the tensioning piston is designed as cylindrical hollow piston which comprises, at its front face, a vent opening in the form of a coaxially arranged vent hole. A vent disk is preceding the vent opening and provided with a meandering or spiral vent channel at its upper side. The vent disk comprises a slot at its circumference, so that air and hydraulic fluid can get from the pressure chamber into the vent channel. The other end of the vent channel flushes with the vent opening, so that air and hydraulic fluid can escape. The cross-section of the vent channel is normally smaller than the cross-section of the vent opening, resulting in a throttle effect that also has an influence on the damping behavior of the tensioning device. The vent channel is only formed in the vent disk in this known tensioning device. The bore shoulder in the tensioning piston only functions to seal the channel.

In another embodiment, the vent disk is an integral part of a packing element whose cylindrical extension projects into the interior of a pressure spring disposed in the pressure room and therefore reduces the total volume of the pressure room. This permits to more quickly fill the pressure room with hydraulic fluid during the starting operation of an internal combustion engine.

Further known tensioning devices are described in DE 4015708 C1, DE 202007008335 U1, and EP 1067275 A2.

It is a disadvantage of the known tensioning devices that only a certain area is available for the effective length of the throttle channel.

SUMMARY OF THE INVENTION

It is therefore the object of the present invention to improve the design of the vent channel in a tensioning device of the type mentioned in the beginning.

A generic tensioning device provides to this end that in the one vent element in the contact surface to the second vent element, separated partial areas of the vent channel are formed by molded groove sections which are connected to each other by transfer grooves molded in the second vent element in the contact surface to the first vent element, such that some sections of a main portion of the cross-section of flow of the vent channel are arranged on the one, and some sections are arranged on the other side of a plane spanned by the contact surfaces. Thereby, the hydraulic fluid does not only flow along the border area between two elements, but the flow is forced to always flow from the one element back again into the other element. While in prior art, the central line of the vent channel essentially extends in one plane, in the present invention, moreover a change of the direction of flow transverse to this plane along a plane spanned by the contact surfaces occurs. By this, the effective length of the vent channel is extended because an additional direction of flow is provided in the room. This change is generated by both vent elements being involved in the formation of the vent channel and the flow mainly takes place within the elements. In prior art, one of the elements only functions as a cover for closing the vent channel, whereby, however, no flow takes place within the element itself. The separate partial areas of the vent channel are arranged in the one vent element and connected to each other by the at least one partial area of the vent channel disposed in the other vent element. Accordingly, the two vent elements supplement each other. Correspondingly, the complete vent channel is formed only by joining the two vent elements. Preferably, the contact surfaces are designed to lie flatly on each other, so that the "spanned plane" is a plane two-dimensionally disposed in space. The term "main portion of the cross-section of flow" is correspondingly defined as more than 50%, preferably more than 90%, or exactly 100% of the cross-section of flow. In the latter case, one of the elements at the correspondingly contemplated point only serves as a cover to limit the flow channel.

One embodiment provides that in the one vent element, the separate partial areas of the vent channel are formed by annular grooves and/or annular groove sections arranged concentrically with respect to each other and connected to each other by transfer grooves extending transversely to them in the other vent element. In principle, the mutual supplementation can be effected in various ways. Concentric annular grooves and/or annular groove sections, however, permit to generate a preferably long vent channel in a very simple constructive manner.

For this, it can be provided that an inflow into an annular groove and/or an annular groove section is arranged by at least 180° with respect to an outflow from the same annular groove and/or the same annular groove section. The degree indication refers each to the central line in the center of the inflow and/or outflow. Here, it is either possible for the flow to split up and flow by 180° each from the inflow to the outflow, or to only flow into one direction, where then normally an angular range of more than 180° is exceeded to provide here, too, a preferably long vent channel.

According to one embodiment, e. g. the inflow and outflow can be arranged to be offset with respect to each other by 270°.

The connection to the vent opening can also be achieved in a very simple manner by the connection between the vent opening and the last annular groove in the flow sequence, and/or the last annular groove section in the flow sequence, being formed by a transfer groove in the other vent element.

This means, transfer is accomplished in a manner similar to that in the other partial areas, while this time, the connection is made to the vent opening.

To reduce the number of parts, it can be provided that the one vent element is formed by the tensioning piston itself. Usually, tensioning pistons are designed as hollow cylindrical pistons with a blind hole bore. At the end of this blind hole bore, the tensioning piston can comprise suited contourings to generate the partial areas of the vent channel.

As an alternative, and to facilitate manufacture, the one vent element can also be formed by a vent disk. The vent disk can be designed similar to that of prior art, whereas the latter forms partial areas of the vent channel only on one side.

It is moreover possible for the other vent element to be formed by a packing element reducing the pressure volume. Packing elements are already well established in prior art, and their use within the pressure room is well-known. In many application cases, this packing element is made of plastics which is why a corresponding contouring for providing partial areas of the vent channel is very easy. For this, the packing element can comprise a disk-shaped head in the upper side of which at least one partial area of the vent channel is arranged.

A preferred embodiment provides that the vent disk is disposed between the disk-shaped head of the packing element and the tensioning piston, and at least in the bottom side of the vent disk, at least one partial area of the vent channel is disposed, the vent disk providing a flow connection to the vent opening. By simple geometries, a suited vent channel can be provided here. It is also possible to generate, by a purposeful selection of the vent disk and the packing element, different damping with one and the same component. The vent disk can e. g. comprise differently designed and/or disposed partial areas of the vent channel on its upper and bottom sides (than on the upper side. The disk can then also be installed the other way round for generating another venting and/or damping characteristic. The complete replacement of a disk otherwise having identical outer dimensions can lead to different damping and venting properties with a corresponding contouring in view of the partial areas of the vent channel. In principle, a flow connection between the pressure room and the vent opening can also be adapted to any situation by such a design. The inflow does not necessarily have to be arranged at or near the outer circumference, and the outflow to the vent opening does not necessarily have to be arranged centrally.

For facilitated assembly, the vent disk can be connected to the packing element by means of a connection device.

In this context, it is also possible for the vent disk to be connected to the packing element in one piece, preferably by means of an integral hinge. Here, e. g. the manufacture of plastics by means of injection-molding offers itself to captively connect the vent disk to the packing element. Moreover, the positioning of the two elements with respect to each other is simultaneously predetermined.

For a cheaper production of the tensioning piston, it is provided according to a further variant that the vent disk comprises a crowned upper side to be located at an inner surface of the tensioning piston having a conical surface area. The bore incorporated into the tensioning piston has a conical surface area at its base. It is best for the crowned upper side of a vent disk to support itself at this conical surface area. This also provides sufficient sealing at this point. The transition between the vent channel and the vent opening can then preferably be within this sealed area.

An axially parallel inflow bore can be preferably arranged in the head of the packing element and provide a flow connection between the pressure chamber and the, in the flow sequence, first partial area of the vent channel in the one vent element. The surface area of the head can then be used for sealing purposes because the inflow does not take place along the surface area but is permitted from the bottom side to the front side through just this axially parallel inflow bore.

Furthermore, the invention relates to a traction drive with a continuous drive device, such as a chain or ring, at least two traction wheels and a tensioning device according to one of claims 1 to 14.

BRIEF DESCRIPTION OF THE DRAWINGS

Below, embodiments of the present invention will be illustrated more in detail with reference to a drawing. In the drawings:

FIG. 13 shows the packing element of FIG. 9 in a perspective front view, FIG. 14 shows the packing element of FIG. 13 in an unfolded state, FIG. 15 shows a schematic flow chart through the packing element of FIG. 13.

DETAILED DESCRIPTION

Figure 1:
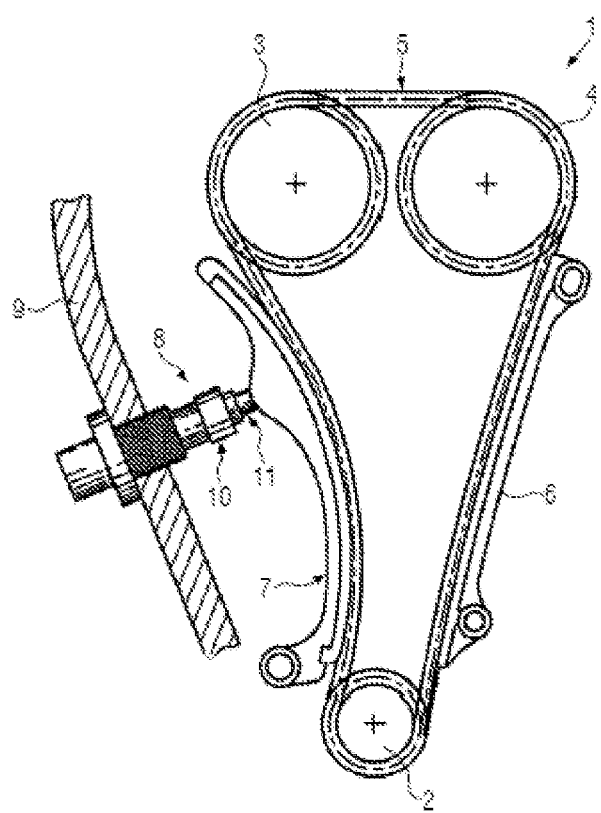
FIG. 1 shows a schematic front view of a timing chain drive.
Figure 5:
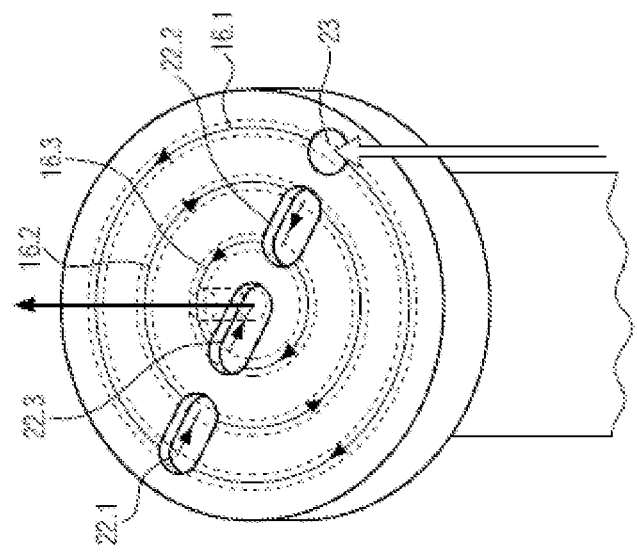
FIG. 5 shows a schematic representation of the flow path through the vent device of FIG. 2.
Figure 4:
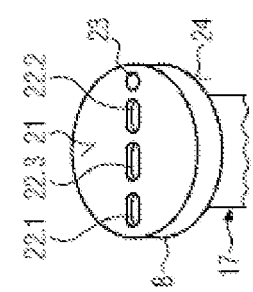
FIG. 4 shows the packing element of FIG. 2 in a perspective plan view.

In FIG. 1, a timing chain drive 1 of an internal combustion engine is schematically shown. The timing chain drive 1 essentially comprises a crankshaft chain wheel 2, two overhead cam chain wheels 3 and 4, a timing chain 5 wound around the chain wheels 5, a slide rail 6, a pivoting tensioning rail 7, and a tensioning device 8 (e. g. a chain adjuster). By way of example, a screw-in chain adjuster 8 screwed into a region of the motor unit frame 9 is represented. The tensioning device 8 comprises a housing 10 and a tensioning piston 11 guided in the housing 10 to be movable in the longitudinal direction. The tensioning device 8 is connected to the engine oil hydraulics, such that hydraulic oil flows into the interior of the tensioner housing 10 via a not represented inflow bore and applies pressure to the tensioning piston 11, such that the latter presses against the swiveling tensioning rail 7, so that the latter is lying against the timing chain 5 with pretension. The principal design of such tensioning devices is well-known, except for the inventive embodiment of the venting to be described more in detail below, reference being made to prior art in this respect. Moreover, it is irrelevant for the invention whether it is a screw-in chain adjuster or a flange chain adjuster, etc.

With reference to FIGS. 2 to 5, now a first embodiment of the invention will be explained more in detail.

Figure 2:
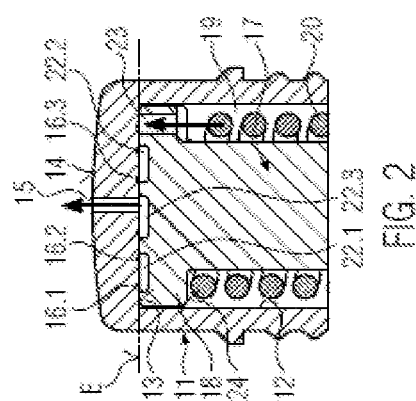
FIG. 2 shows the front part of the tensioning device of FIG. 1 in a full section view.
Figure 3:
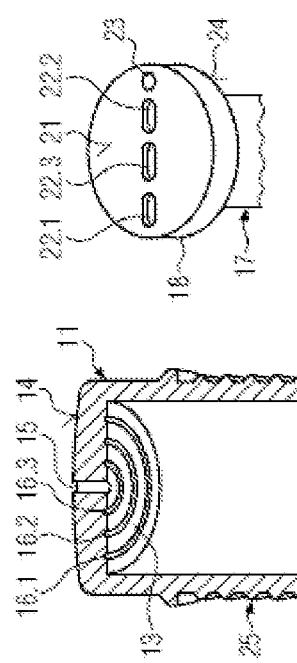
FIG. 3 shows the front part of the tensioning piston in a perspective sectional representation.

FIG. 2 shows the front region of the tensioning device 8 (the housing is not represented). The tensioning piston 11 is designed as cylindrical hollow piston and has a cylindrical receiving bore 12 with an essentially flat base area 13. The tensioning piston 11 is provided with a vent opening 15 in the form of a cylindrical bore in the center of the front face 14. Three annular grooves 16.1, 16.2, and 16.3 are molded as indentations at regular distances into the essentially plane base area 13.

A packing element 17 is arranged in the receiving bore 12 of the tensioning piston 11, the packing element 17 comprising a disk-shaped head 18 of a cylindrical basic shape. The packing element 17 is pressed with its essentially flat upper side 21 against the base area 13 of the tensioning piston 11 by means of a pressure spring 20 arranged in a pressure chamber 19. The pressure chamber 19 extends between the housing 10 and the tensioning piston 11. The packing element 17 also serves to reduce the pressure volume, so that it fills more quickly with hydraulic oil in a cold start of the internal combustion engine. Three straight transfer grooves 22.1, 22.2, and 22.3 are arranged in the upper side 21 of the head 18 one behind the other along the central line of the head 18. On the same line as these three grooves 22.1, 22.2, 22.3, an axially parallel inflow bore is also provided and extends from the bottom side 24 of the head 18 to its upper side 21 and has a circular cross-section. The base area 13 of the tensioning piston 11 provides a plane contact surface to the upper side 21 of the packing element 17 that also serves as plane contact surface, both lying flatly against each other and in this adjacent state together spanning a plane E that extends perpendicularly to the drawing plane.

The arrangement and length of the transfer grooves 22.1, 22.2, 22.3 and the inflow bore 23 are selected in a special way. One can now see how they act with reference to FIG. 5. The inflow bore 23 establishes a connection to the pressure chamber 19. Therefore, the annular groove 16.1 is also in communication with the pressure chamber 19 by means of the inflow bore 23. The flow then splits and flows each along the two arc-shaped branches of the annular groove 16.1 by about 180° to the opposite side of the head 18. There, the annular groove 16.1 joins the transfer groove 22.1 which connects the annular groove 16.1 with the annular groove 16.2. While the vent flow initially only flows within the annular groove 16.1, that means within an indentation in the tensioning piston 11, the flow now flows in the region of the transfer groove 22.1 also into the head 18, through the transfer groove 22.1, and from there again out of the head 18 and into the annular groove 16.2. Again, the flow splits into two branches until the flow, that now flows again within the tensioning piston 11, reaches the next transfer groove 22.2, again offset by 180°, flows again into the head 18 and through the transfer groove 22.2 which then provides a connection to the annular groove 16.3. There, the vent flow flows again out of the transfer groove 22.2 and into the tensioning piston 11, splits here again into two flow branches which are joined again each offset by 180°, and the flow here flows into the third transfer groove 22.3 in the head 18. This last transfer groove 22.3 then establishes the flow connection to the centrally arranged vent opening 15.

By this embodiment, a relatively long vent channel provided with many direction changes of the flow is formed which connects the pressure chamber 19 with the vent opening 15. By the embodiment of the vent channel by means of two vent elements that contact each other (tensioning piston 11 and packing element 17), the damping behavior of the tensioning device 8 can also be influenced.

Accordingly, the branching is not only effected in the plane spanned within the tensioning piston 11 by the annular grooves 16.1, 16.2, and 16.3, but also perpendicularly to it because the flow is forced again and again to flow out of the tensioning piston 11 and into the head 18 of the packing element. So, both the tensioning piston 11 and the packing element 17 provide partial areas of a vent channel which only form a continuous vent channel by mutual interaction. By this considerably longer vent channel, oil losses are also reduced. One portion (the annular grooves 16.1, 16.2, 16.3) of the thus formed flow channel is accordingly located above the plane E, and one portion (the transfer grooves 22.1, 22.2, 22.3) underneath the plane E.

At the outer circumference of the tensioning piston 11, stop teeth 25 are moreover provided that offer an entry limit or stop in interaction with the housing 10 and a locking clip to be described more in detail below.

Figure 8:
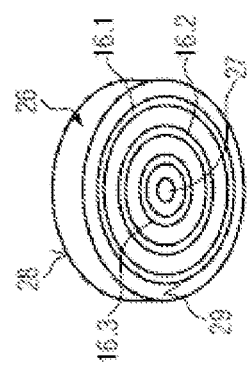
FIG. 8 shows the vent disk of FIG. 6 in a perspective bottom view.
Figure 7:
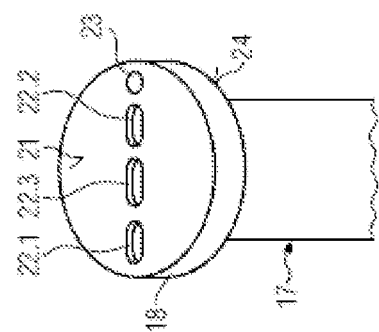
FIG. 7 shows the packing element of FIG. 6 in a perspective plan view.
Figure 6:
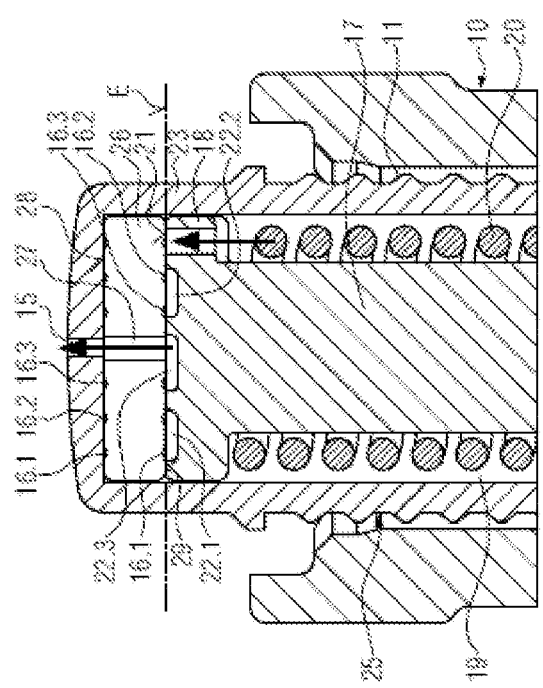
FIG. 6 shows a second embodiment of a front area of a tensioning device in a full section view.

With reference to FIGS. 6 to 8, now a second embodiment of the present invention will be explained more in detail. Below, only the essential differences to the previous embodiment will be discussed, which is why reference is made to the above embodiment referring to the above description and using the same reference numerals.

The base area 13 of the tensioning piston 11 does not comprise any annular grooves in this embodiment but is essentially designed flatly without indentations. Only the central vent opening 15 is still present. The packing element 17 is identical to the packing element of the previous embodiment. In this embodiment, a vent disk 26 is used in addition. This means, the two vent elements are provided on the one hand by the packing element 17 and on the other hand by the vent disk 26. The vent disk 26 can be made e. g. of a plastic, preferably PA, or of a sintered metal. The vent disk 26 comprises a central continuous bore 27 aligned with the vent opening 15. The vent disk 26 is arranged between the head 18 of the packing element 17 and the base area 13 of the tensioning piston 11. In order to permit to install the vent disk 26 in both directions, it comprises both on the upper side 28 and on the bottom side 29, three annular grooves 16.1, 16.2, and 16.3 each arranged at a distance to each other and concentrically with respect to the center. These annular grooves 16.1, 16.2, and 16.3 are arranged just as the annular grooves in the previous embodiment and form, together with the transfer grooves 22.1, 22.2, and 22.3, a vent channel in the head 18 of the packing element 17. The annular grooves each facing the base area 13 are not involved in the formation of the vent channel. The plane E is spanned between the upper side 21 of the packing element 17 serving as contact surface and the bottom side 29 of the vent disk 26 serving as contact surface, or is predetermined by them, and extends perpendicularly to the drawing plane.

The further functioning of this embodiment is identical to the functioning of the previous embodiment.

Below, a third embodiment of the present invention will be illustrated more in detail with reference to FIGS. 9 to 15. Essentially, only the differences to the previous embodiment will be discussed, which is why reference is made to the previous description using the same reference numerals.

Figure 9:
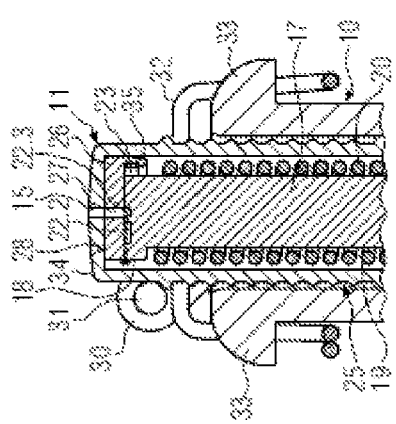
FIG. 9 shows a second embodiment of the front area of a tensioning device in a full section view.
Figure 10:
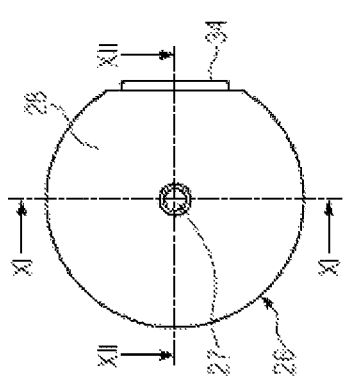
FIG. 10 shows the packing element of FIG. 9 in a plan view.
Figure 11:
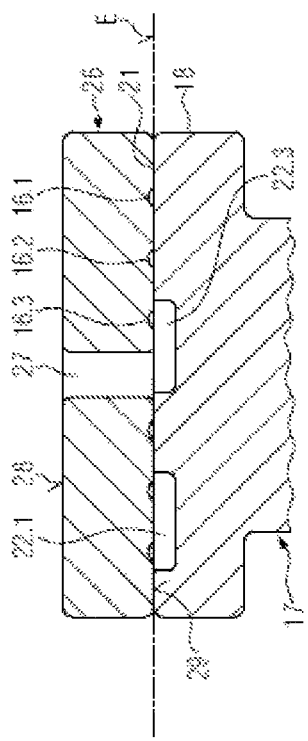
FIG. 11 shows the head of the packing element of FIG. 10 cut along line XI-XI.
Figure 12:
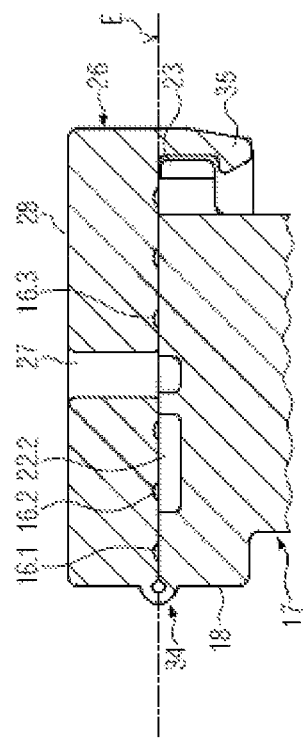
FIG. 12 shows the head of the packing element cut along line XII-XII in FIG. 10.
Figure 19:
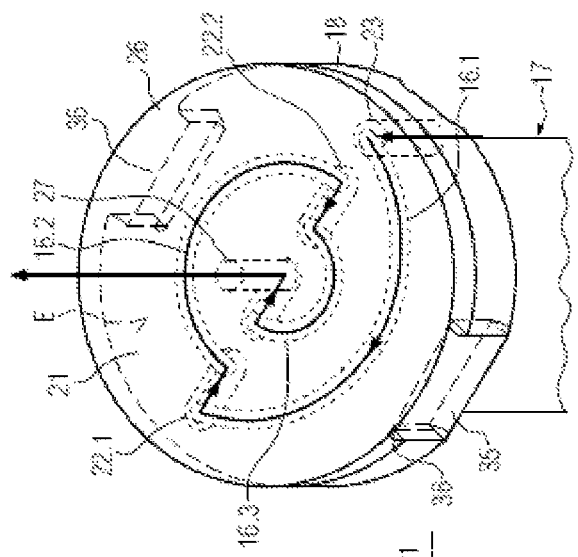
FIG. 19 shows a schematic flow chart through the packing element of FIG. 16.
Figure 18:
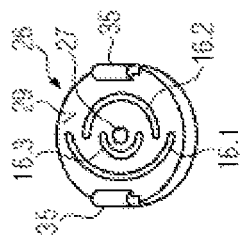
FIG. 18 shows a bottom view of a vent disk of FIG. 16.
Figure 17:
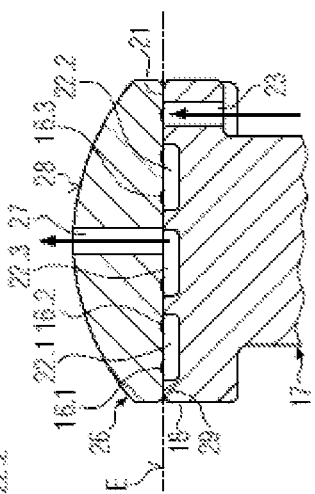
FIG. 17 shows the head of the packing element of FIG. 16 in a full section view.
Figure 16:
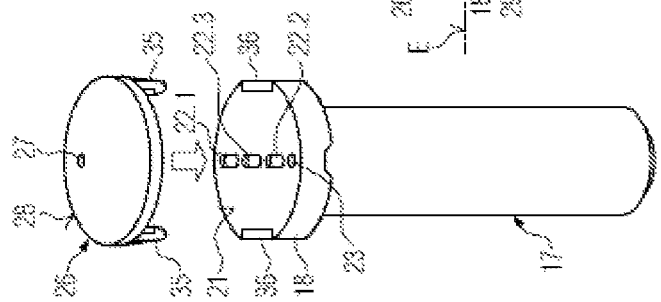
FIG. 16 shows a variant of the packing element in a perspective exploded view.

One can see in FIG. 9 that at the front end of the housing 10, a locking eye 30 and a locking pin 31 are provided to retain the tensioning piston 11 in the represented retracted locking position. After the tensioning device 8 has been installed, the locking pin 31 is removed and the tensioning piston 11 thus released. A locking clip 32 cooperating with the front end of the housing 10 engages the stop teeth 25 at the outer circumference of the tensioning piston 11. The locking clip 32 grips over projections 33 arranged at the end of the housing 10. The locking clip 32 on the one hand prevents the tensioning piston 11 from entering too far into the housing 10. On the other hand, when the tensioning piston 11 is further extended, the projections 33 cause the locking clip 32 to hit it and to jump into the next stop groove of the stop teeth. By this, the working range of the tensioning piston is dislocated, so that it is continuously tracked, in particular if the chain is elongated due to wear and a further extended tensioning piston 11 is required. The vent disk 26 and the head 18 of the packing element 17 are designed as uniform component and connected to each other on the one side by means of an integral hinge 34, and on the opposite side by means of a latch 35 that engages a recess 36 at the head 18. By this, the vent disk 26 is captively connected to the packing element 17.

The guidance of the vent channel starting from the inflow bore 23 arranged laterally adjacent to the recess 36 has a somewhat different guidance or design than in the previous embodiments. The bottom side 29 of the vent disk 26 is provided with three angular groove sections 16.1, 16.2, 16.3 arranged concentrically and at distances with respect to each other. These annular groove sections 16.1, 16.2, 16.3 each describe a three-quarter circular arc. The inflow end of the outer annular groove section 16.1 is aligned with the inflow bore 23 in the head 18. The opposite end of the annular groove section 16.1 is, via a transfer groove 22.1 formed in the upper side 21 of the head 18, in communication with the inflow end of the central annular groove section 16.2. The outflow end of the annular groove section 16.2 is, via a transfer groove 22.2 arranged perpendicularly to the first one, in communication with the inflow end of the inner annular groove section 16.3. The outflow end of the inner annular groove section 16.3 is, via a transfer groove 22.3 arranged again rotated by 90°, in flowing communication with the central bore 27 in the vent disk 26 and thus the vent opening 15. In this embodiment of the vent channel, the flow is not split but continuously flows from the inflow bore 23 through the vent channel and into the vent opening 15. The vent channel is in this case partially located above (annular groove sections 16.1, 16.2, 16.3) and partially underneath (transfer grooves 22.1, 22.2, 22.3) the plane E defined by the bottom side 29 of the vent disk 26 and the upper side 21 of the packing element 17.

With reference to FIGS. 16 to 19, now a fourth embodiment of the invention will be explained more in detail. Only the essential differences to the previous embodiments will be discussed, which is why reference is made to identical components of the previous embodiments having identical effects using the same reference numerals. A simple variant of the production of a tensioning piston 11 is the provision of a base area 13 which is designed in the form of a conical surface area (not represented). By this, common boring or drilling tools can be used for producing the receiving bore 12. To nevertheless generate a tight contact with the tensioning piston, the vent disk 26 is in this embodiment designed to be crowned at its upper side 28, i.e. like a spherical segment. Moreover, the vent disk 26 is provided with two latches 35 which engage in corresponding recesses 36 in the head 18 of the packing element 17. By this, the vent disk 26 is firmly connected to the head 18. Here, too, the guidance of the vent channel is designed somewhat differently. Except for the recesses 36, the packing element 17 is essentially identical to the packing element 17 of the first embodiment. Starting from the inflow bore 23 which connects the vent channel with the pressure chamber 19, the flow flows along the vent channel to the centrical bore 27 and then into the vent opening 15. For this, three annular groove sections 16.1, 16.2, and 16.3 are disposed on the bottom side 29 of the vent disk 26. These are each designed as semi-circular annular groove sections. The annular groove sections 16.1, 16.2, 16.3 are not necessarily arranged coaxially with respect to each other, so that a sufficient distance to the recesses 36 remains. The inflow is effected via the inflow bore 23 into the first annular groove section 16.1. At the outflow end of this annular groove section 16.1, the flow flows into the first transfer groove 22.1 into the head 18 and subsequently into the inflow end of the second annular groove section 16.2. At the opposite outflow end of this annular groove section 16.2, there is a connection to the inflow end of the innermost annular groove section 16.3 via the transfer groove 22.2. The opposite outflow end of this annular groove section 16.3 is in flow connection with the central bore 27 and then the vent opening 15 via the central transfer groove 22.3. The vent channel is in this case partially located above (annular groove sections 16.1, 16.2, 16.3) and partially underneath (transfer grooves 22.1, 22.2, 22.3) the plane E defined by the bottom side 29 of the vent disk 26 and the upper side 21 of the packing element 17.

The design of the packing element 17 and the vent disk 26 can be completely of plastics, e. g. PA, in the present example.

The versatile embodiments show that the interaction of two components permits different guidances of the vent channel. Insofar, the embodiments shown here can also be arbitrarily combined, and this in view of the respective embodiment of the packing element 17, the vent disk 26 and the vent channel guidance between these elements. The various embodiments also show that the vent channels can be of different lengths, whereby different damping and venting properties result which can be purposefully employed for such tensioning devices. Moreover, by vent channels designed in this way, oil losses via this vent channel can be also restricted.

The invention claimed is:

1. A tensioning device for a continuous drive element, in particular a timing chain of an internal combustion engine, comprising: a housing, a tensioning piston movably guided in the housing, and a pressure chamber for a hydraulic fluid formed between the housing and the tensioning piston, wherein the tensioning piston comprises a vent opening, and a vent channel disposed between the pressure chamber and the vent opening is provided, which is formed by assembling at least two vent elements, characterized in that in the one vent element, in the contact surface to the second vent element, separate partial areas of the vent channel are formed by molded groove sections which are connected to each other by transfer grooves molded in the second vent element in the contact surface to the first vent element, such that some sections of a main portion of the cross-section of flow of the vent channel are arranged on the one, and some sections are arranged on the other side of a plane spanned by the contact surfaces.

2. The tensioning device according to claim 1, wherein in the one vent element, the separate partial areas of the vent channel are formed by annular grooves and/or annular groove sections arranged concentrically with respect to each other, which are connected to each other by the transfer grooves extending transversely to them in the other vent element.

3. The tensioning device according to claim 2, wherein an inflow into an annular groove and/or an annular groove section is arranged by at least 180° with respect to an outflow from the same annular groove and/or the same annular groove section.

4. The tensioning according to claim 2, wherein the connection between the vent opening and the last annular groove in the flow sequence and/or the last annular groove section in the flow sequence is formed by a transfer groove in the other vent element.

5. The tensioning device according to claim 1, wherein a vent element is formed by the tensioning piston itself.

6. The tensioning device according to claim 1, wherein the one vent element is formed by a vent disk.

7. The tensioning device according to claim 6, wherein the vent disk comprises a crowned upper side to be located at an inner surface of the tensioning piston of a conical surface area.

8. The tensioning device according to claim 1, wherein the other vent element is formed by a packing element reducing the pressure room volume.

9. The tensioning device according to claim 8, wherein the packing element comprises a disk-shaped head in the upper side of which at least one partial area of the vent channel is arranged.

10. The tensioning device according to claim 9, wherein the vent disk is arranged between the disk-shaped head of the packing element and the tensioning piston, and at least in the bottom side of the vent disk, at least one partial area of the vent channel is arranged, and the vent disk provides a flow connection to the vent opening.

11. The tensioning device according to claim 10, wherein in the head of the packing element, an axially parallel inflow bore is arranged which provides a flow connection between the pressure chamber and the, in the flow sequence first partial area of the vent channel in the one vent element.

12. The tensioning device according to claim 8, wherein the vent disk is connected to the packing element by means of a connection device.

13. The tensioning device according to claim 8, wherein the vent disk is connected in one piece with the packing element, preferably by means of an integral hinge.

14. A traction drive with a continuous drive device, such as a chain or a belt, at least two traction wheels, and a tensioning device according to claim 1.

* * * * *